United States Patent [19]

Anglin et al.

[11] Patent Number: 5,136,146

[45] Date of Patent: Aug. 4, 1992

[54] TERMINAL APPARATUS WITH REMOVABLE MEMORY DEVICE

[75] Inventors: Noah L. Anglin, San Jose; Stanley J. Hludzinski, Auburn, both of Calif.

[73] Assignee: Verifone, Inc., Redwood City, Calif.

[21] Appl. No.: 659,502

[22] Filed: Feb. 22, 1991

[51] Int. Cl.$^5$ .......................... G06K 7/06; G06K 7/04
[52] U.S. Cl. ..................................... 235/441; 235/444
[58] Field of Search ....................... 235/441, 444, 453; 369/200

[56] References Cited

U.S. PATENT DOCUMENTS

| | | | |
|---|---|---|---|
| 4,615,015 | 9/1986 | Olander, Jr. et al. | 364/200 |
| 4,931,622 | 6/1990 | Ohtsuki et al. | 235/487 |
| 5,016,086 | 5/1991 | Inoue et al. | 235/441 |
| 5,028,767 | 7/1991 | Mizuno | 235/441 |

OTHER PUBLICATIONS

HP41 Owners Handbook Apr. 1982 pp. 5a, 5b, 256–259.
T159 1979 p. 45.
HP41 Math Pac Feb. 1984 pp. 4,5.

*Primary Examiner*—Stuart S. Levy
*Assistant Examiner*—Richard M. Weinberg
*Attorney, Agent, or Firm*—Lowell C. Bergstedt

[57] ABSTRACT

Electronic circuit apparatus in the form of a transaction terminal and including a removable circuit component in the form of a portable memory cartridge. The terminal has a housing with a wall defining an opening for inserting the removable circuit component. A switch is mounted within the housing means substantially in the vicinity of the opening and is connected between a source of electric power and the removable circuit component to control application of power to the removable circuit component. A carrier arrangement carries the removable circuit component between a connected position within the housing and a disconnected position for removal from the housing through the opening. The carrier including a switch actuator and a cooperative interlock means. The switch actuator operates the switch to be ON and simultaneously locks the carrier within the housing. The switch actuator also functions to turn the switch OFF and simultaneously unlock the carrier for removal from the housing.

4 Claims, 4 Drawing Sheets

TERMINAL APPARATUS WITH REMOVABLE MEMORY DEVICE

FIELD OF THE INVENTION

This invention relates generally to electronic systems with removable circuit modules and more specifically to terminal systems, e.g. transaction terminal systems, and general or special purpose computer systems which employ removable memory cartridges (also called memory cards or JEIDA cards).

BACKGROUND AND PRIOR ART

Removable, portable circuit components, such as portable memory cartridges, have been utilized in computer and video game terminals for a number of years. Such memory cartridges have a connector on one end which plugs into a connector mounted on the terminal. To protect the memory cartridge, it is imperative that the supply of electrical power to the cartridge be turned off prior to either insertion or removal of the cartridge from the connector.

A variety of approaches have been taken to protecting removable circuit components from damage due to electrical transients that are produced if the component is removed or inserted while power is being applied to the connector pins. For example, in some video games and personal computers that utilize ROM program cartridges, an access cover is provided over the connector and cartridge and a power cut-off switch is operatively associated with the cover so that the electrical power to the cartridge connector is cut off when the cover is opened regardless of whether the main power switch of the unit is on or off. The use of a separate cover with power switch interlock is not an attractive design arrangement for the small terminal and portable computer environment.

In some portable memory cartridge applications, the system relies solely on different pin lengths in the connectors to sequence the connection and disconnection of power supply voltages to the cartridge as it is being removed or inserted. In other words, the lengths of the pins is arranged so that pins carrying power are connected last and disconnected first.

In some systems, the portable memory cartridge itself is inserted directly into the unit using a guide arrangement to assure alignment of the connector pins as the device is inserted. In this arrangement, one end of the portable memory cartridge must extend outside the housing walls to provide a place to grasp the component for disconnecting it from the system. This arrangement leaves the portable memory cartridge subject to possibilities of being struck by some object which might damage it or the connector arrangement. In other systems, the portable memory cartridge is carried in a tray to protect the system, but there is no positive interlock on the tray which turns off the power to the portable memory cartridge prior to beginning to remove the cartridge and tray from the system.

It is also known in the prior art to provide for a special arrangement on the tray carrying the portable memory cartridge cooperating with extra pins on the connector to switch power to the portable memory cartridge on and off as the tray is inserted and removed.

OBJECTS OF THE INVENTION

It is the principal object of this invention to provide an improved power cut off safety arrangement for a removable circuit component used in electronic circuit apparatus.

It is another object of this invention to provide an improved arrangement for handling of a portable memory cartridge in a computer based system.

It is another object of this invention to provide a transaction terminal with an improved portable memory cartridge tray arrangement having a combined power cut off switch actuator and mechanical interlocking arrangement.

It is another object of this invention to provide a transaction terminal with a portable memory cartridge that is positioned in a protected position entirely within the terminal housing when inserted.

FEATURES AND ADVANTAGES OF THE INVENTION

One aspect of this invention features an electronic apparatus which includes a removable circuit component and a housing including a wall defining an opening for inserting the removable circuit component. A connector means is mounted within the housing opposite the opening and receives the connector on the removable circuit component. A switch is mounted within the housing means substantially in the vicinity of the opening and is connected between a source of electric power and the removable circuit component to control application of power thereto. A carrier means carries the removable circuit component between a connected position within the housing and a disconnected position for removal from the housing through the opening and includes a switch actuator means manually movable between respective ON and OFF positions. This switch actuator is operable when the removable circuit component is in the connected position in the housing to close the switch means and apply power to the removable circuit component when moved from the OFF position to the ON position. It is further operable when in that position to open the switch means and disconnect power from the removable circuit component when moved from the ON position to the OFF position. A cooperative interlock arrangement is provided on the housing and the carrier means and is operatively associated with the switch actuator means when the carrier means is in the connected position to mechanically lock the carrier means within the housing when the switch actuator means is in the ON position and to unlock the carrier means for removal from the housing when the switch actuator mean is in the OFF position.

Another specific aspect of this invention features a transaction terminal apparatus which includes a portable memory cartridge. The terminal includes a a housing having a sidewall defining a generally rectangular opening. A tray member is adapted for carrying a portable memory cartridge and is insertable in the opening in the sidewall. The portable memory cartridge has a connector on one end thereof and is carried in the tray with the connector facing a direction opposite to the opening in the sidewall of the housing. A guide means is mounted within housing for guiding the tray member as it is being inserted. A connector means is mounted in the housing at one end of the guide means and faces the opening for engaging the connector on the portable memory cartridge to connect the portable memory cartridge with circuitry of the transaction terminal. A power supply means supplies power to circuits of the transaction terminal including the portable memory cartridge through the connector means. A switch means is in circuit with the power supply means for controlling the supply of power to at least the portable memory cartridge with this switch means being mounted within the housing adjacent the opening in the sidewall. A switch actuator means is carried on the tray member including a first member accessable outside the housing when the tray member is inserted therein and being movable between ON and OFF positions and a second member positioned within the housing when the tray member is inserted and being moved by the first member between first and second positions respectively associated with the On and OFF positions. The second member is operative when in the first position to turn the switch means ON and also to engage a portion of the sidewall to preclude removal of the tray from the housing while the switch means is ON and power is applied to a portable memory cartridge carried on the tray.

One advantage of this combined power switch and carrier or tray interlock arrangement is that failsafe operation is ensured. The carrier cannot be removed from the terminal until the switch actuator is moved to the OFF position to thereby release the cooperative interlock means between housing and carrier. This ensures that the electric power to the removable circuit component or portable memory cartridge is completely cutoff before it is disconnected from the system. Similarly, when the carrier is being inserted, removable circuit component or portable memory cartridge will be fully connected into the system before the switch actuator can be moved to the ON position to switch on the electric power and actuate the cooperative interlock means.

Another advantage is that use of a carrier or tray for the portable memory cartridge with a handle on one end provides the safety feature of the tray and also makes it easy to integrate the switch actuator into the carrier and facilitates insertion and removal of the device.

Other objects, features and advantages of this invention will be apparent from a consideration of the following detailed description taken in conjunction with the accompanying drawings.

DETAILED DESCRIPTION OF INVENTION EMBODIMENTS

Figure 1:
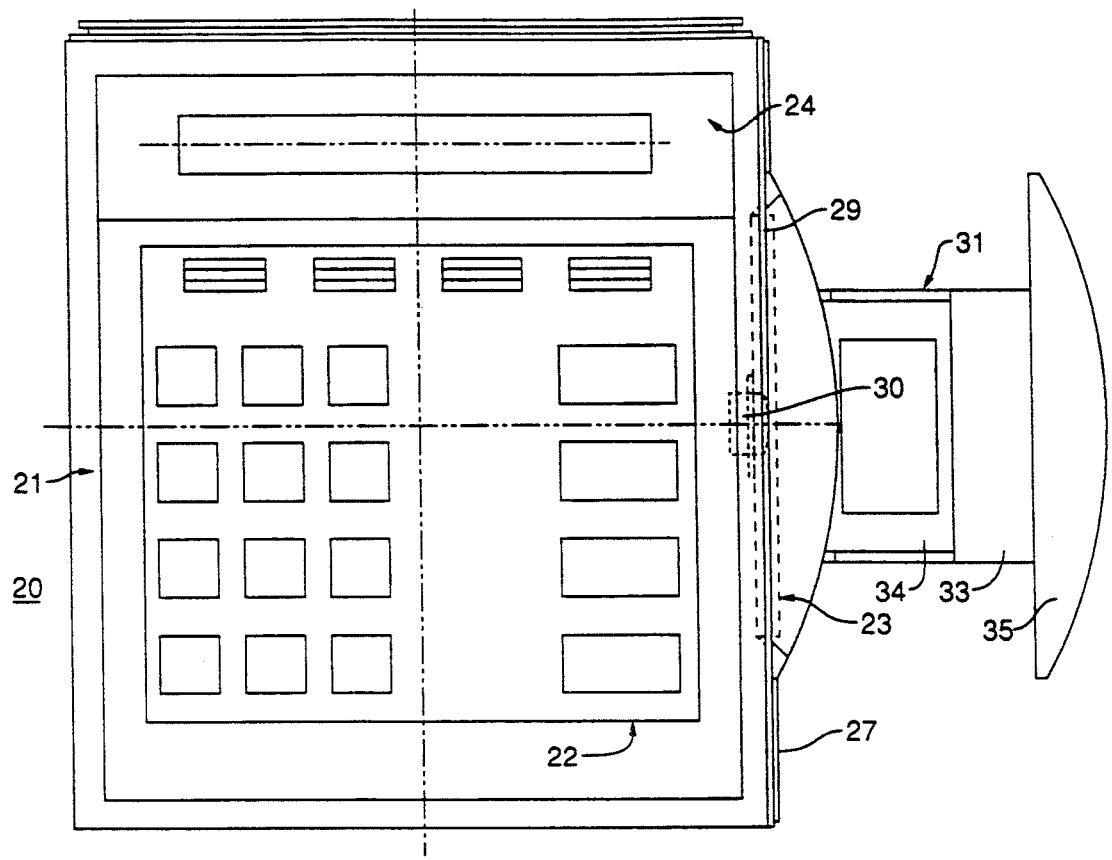
FIG. 1 is a top plan view of a point of sale terminal incorporating a removable circuit component in accordance with this invention.

Referring now to FIGS. 1-5, the elements of this invention are shown as comprising an electronic circuit apparatus 20 having a reader subassembly 23 for reading a data carrier (not shown) and a removable circuit component assembly 31. Apparatus 20 in this embodiment is in the form of a point of sale transaction automation terminal. It should be understood that this invention is adaptable to use with various forms of electronic circuit apparatus, such as personal computers, especially of the portable laptop or notebook type, industrial data collection terminals and the like.

Apparatus 20 includes a housing 21 which defines a guide slot location 29 for manual swiping of a data carrier through a reader arrangement. A transducer in the form of magnetic read head 30 is provided for reading data stored on a data stripe on the data carrier. Details of a preferred form of transaction terminal serving a one application embodiment of this invention are given in copending and commonly assigned U.S. Pat. application Ser. No. 07/617,344, entitled "Card Reader Apparatus with Replacable Card Guide."

Point of sale terminal 20, which incorporates features of this invention, includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies including removable circuit component assembly 31. Typically, the electronic circuitry of terminal 20 includes a microprocessor and associated program and data memory, and removable circuit component assembly 31 includes a portable memory cartridge 34 which is utilized by terminal 20 either to communicate program information or data to terminal 20 or to store data from transactions entered on the terminal. It should be understood that these are design details specific to this application embodiment and do not limit the applicability of the invention.

As shown in FIGS. 1-5, in the embodiment of this invention applied to a transaction terminal, the portable memory cartridge 34 is carried in a tray 33 which has a handle 35 on one end thereof. Tray 33 is removably inserted in an opening 32 in sidewall 27 of housing assembly 21. In this embodiment, handle 35 is designed to match the other design aspects of the terminal. It should be apparent that, in other embodiments for other applications, other types of handle arrangements would be employed and this invention is not limited to the details shown in this embodiment. It should be noted, however, that this tray and handle arrangement provides for positioning of the portable memory cartridge 34 entirely within the terminal housing when it is inserted for operation. This protects portable memory cartridge 34 from damage due to possible shock or accidental liquid spills.

Figure 3:
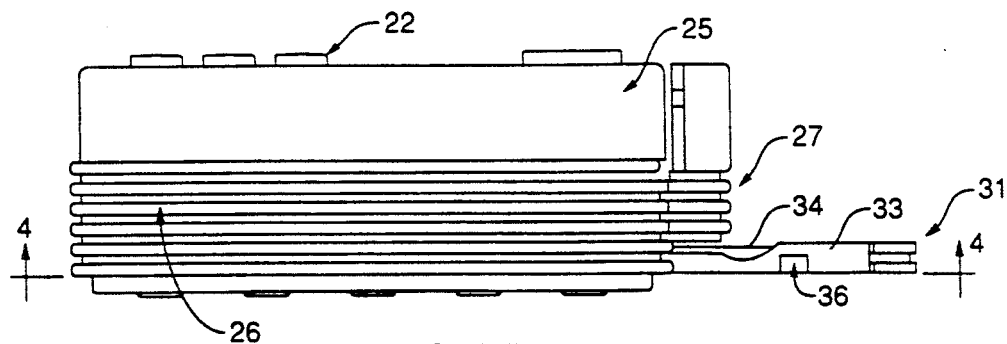
FIG. 3 is a front elevational view of the point of sale terminal of FIG. 1.
Figure 4:
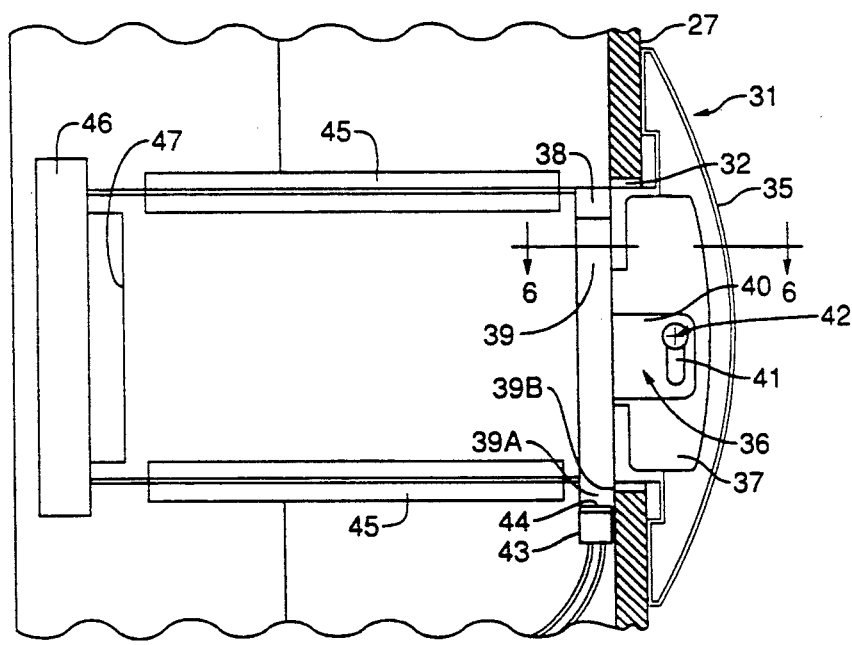
FIG. 4 is a partial section view of the point of sale terminal of FIG. 1 taken along the lines 4—4 in FIG. 3 but showing the drawer for the removable circuit component in a closed and latched configuration.
Figure 5:
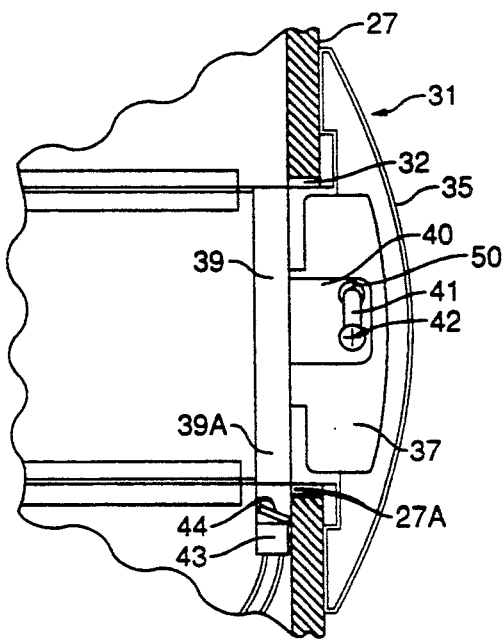
FIG. 5 is a partial view corresponding to the view in FIG. 4 but with the drawer in a closed by unlatched configuration.
Figure 7:
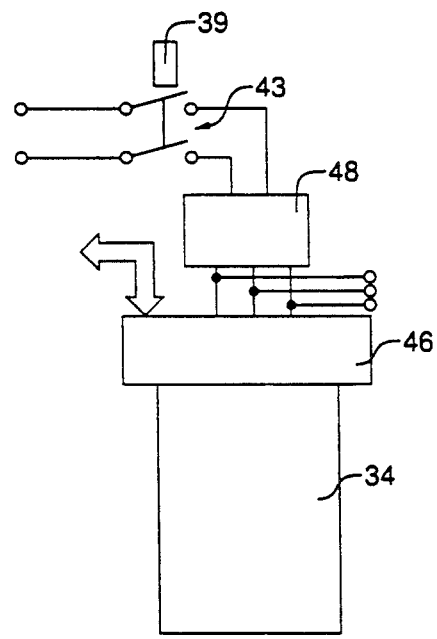
FIG. 7 is a schematic drawing of a power interlock arrangement in accordance with this invention.

Referring specifically to FIGS. 3-5, it is seen that electrical switch 43 is mounted within housing 21 near opening 32 in sidewall 27. As shown in FIG. 7, switch 43 is connected between a source of electric power and connector 46 for portable memory cartridge 34 (or memory card) to control application of power thereto through connector 46. Tray or carrier 33 includes a switch actuator assembly 36 which is manually movable between an ON position shown in FIG. 4 and an OFF position shown in FIG. 5. In the ON position, end portion 39A of actuator bar element 39 pushes switch closure element 44 which, in turn, closes switch contacts within switch assembly 43. At the same time, one side of end portion 39A abutts wall section 27A adjacent opening 32 in sidewall 27 and locks carrier tray 33 within the housing.

In the OFF position, end portion 39A is withdrawn into channel 38, releasing switch closure element 44 and opening the switch contacts within switch 43 and removing power from connector 46. Tray 33 can then be withdrawn from housing 21 to permit portable memory cartridge 34 to be removed from terminal 20.

Figure 6:
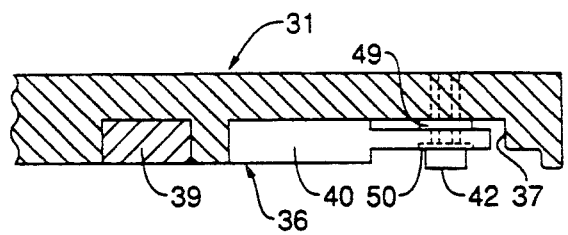
FIG. 6 is a partial section view taken along the lines 6—6 in FIG. 4.

As shown in FIGS. 4-6, switch actuator means 36 comprises a first member 40 which is always accessible outside the terminal housing and is slidably mounted to tray 33 using a cooperating slot 41 and screw 42 which is fastened into tray 33 as best shown in FIG. 6. Second member 39 is a bar mounted within slot 38 and is operably coupled (connected in this case) to first member 40 for movement between first and second positions, respectively, as shown in FIGS. 4 and 5. A cooperative interlock means comprises edge portion 27A of side wall 27 and an edge portion 39B of second member 39.

With this cooperative interlock means in the position shown in FIG. 4, carrier 33 cannot be withdrawn from housing 21 and switch 43 is ON to apply power through connector 46 to portable memory cartridge 34. As is well known, portable memory cartridge 34 has a connector portion on one end which is received in connector 46 to couple power, data and control signal lines from a microprocessor arrangement (not shown) to portable memory cartridge 34.

With the cooperative interlock means in the position shown in FIG. 5, switch 43 is OFF and power is removed from portable memory cartridge. Carrier 33 can then be withdrawn from housing 21 without harming the portable memory cartridge 34.

Figure 2:
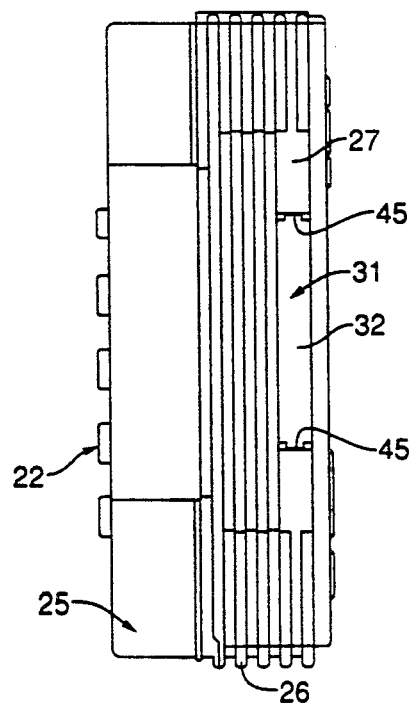
FIG. 2 is a right side elevational view of the point of sale terminal of FIG. 1.

As shown in FIGS. 2 and 4, tray guide elements 45 are mounted within housing 21 to support and guide tray 33 during insertion and removal. These guides ensure that the connector on portable memory cartridge 34 will mate properly with connector 46 within housing 21. In this specific embodiment, the tray guides are separate elements that are mounted on a metal shield which is, in turn, mounted in the bottom of the housing of the terminal. It should be understood that other arrangements for providing this tray guide coudl be employed, such as molding guides directly into the structure of the bottom portion 26 of housing 21.

As shown in FIG. 6, first member 40 of switch actuator assembly 39 is mounted within a recessed area 37 provided in the underside of handle 35. As so arranged an operator of terminal 20 can readily reach a finger underneath handle 35 and slide first member 40 between ON and OFF positions. A recessed area 50 may be provided in the ON end of slot 41 to cooperate with a spring washer 49 to provide a snapping sound which gives an audible indication that the carrier 33 is locked and the power interlock switch 43 is ON.

As shown in FIG. 7, switch 43 may be connected between an external source of AC power and a DC power supply 48 within the terminal so that switch 43 also serves an an ON/OFF switch for all of the circuitry of the terminal. Alternatively, switch 43 could be connected between power supply 48 and connector 46 so that it controls the supply of power only to portable memory cartridge 34.

Figure 8:
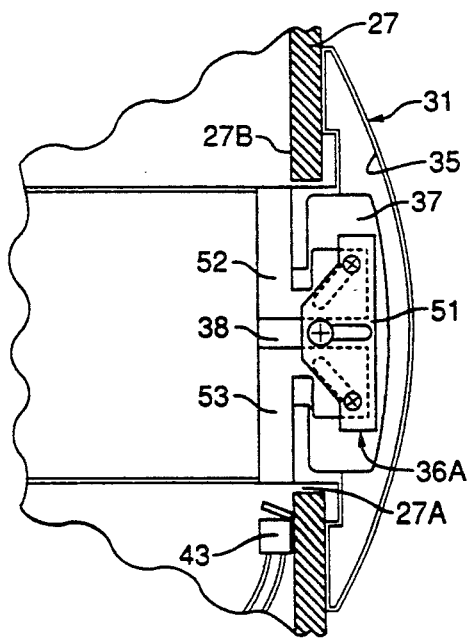
FIGS. 8 and 9 are partial section views illustrating an alternative drawer latching arrangement in accordance with this invention.
Figure 9:
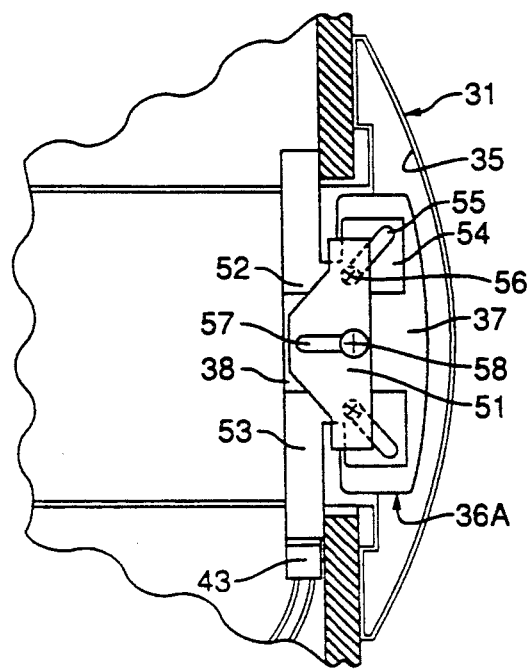

FIGS. 8 and 9 illustrate another embodiment of a combination switch actuator means and cooperative interlock means in accordance with this invention. In this embodiment a first member 51 is slidably mounted within recess 37 of handle 35 and is manually slidable between an OFF position shown in FIG. 8 and an ON position shown in FIG. 9. A second member 53 moves in and out of channel 38 as first member 51 is moved between ON and OFF positions and operates switch 43 just as in the first embodiment.

In this embodiment, cooperative interlock means comprises both bar elements 52 and 53 and associated wall portions 27A and 27B of sidewall 27 to provide a locking engagement of bars elements 52 and 53 on both sides of tray or carrier 34.

First member 51 is slidably mounted using a slot 57 and screw 58. Cams 56 on first member 51 cooperate with angled slots 55 on members 52 and 53 to translate the in and out movement of member 51 into sideways movement of members 52 and 53.

Figure 10:
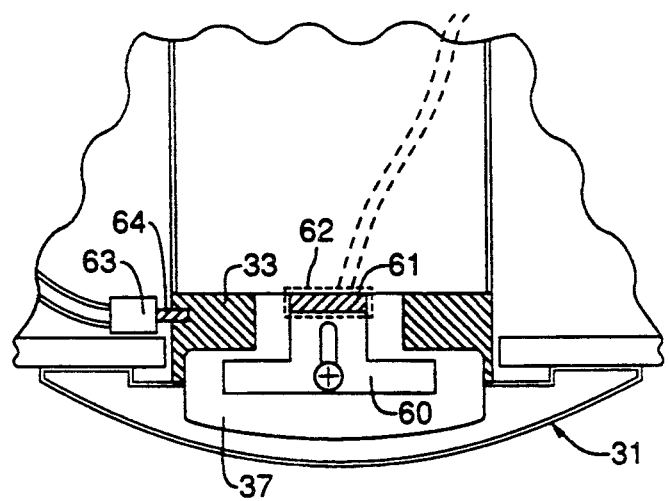
FIG. 10 is a partial section view illustrating an alternative embodiment of a drawer latch and power interlock arrangement in accordance with this invention.

It will be appreciated by persons of skill in the art that a number of other alternative embodiments of a combination switch actuator and tray interlock arrangement could be provided in accordance with this invention. FIG. 10 illustrates another embodiment which utilizes the principles of this invention in a more sophisticated arrangement. In this embodiment, switch actuator member 60 is slidably mounted for in and out movement and carries a magnetic actuator 61 thereon to actuate a magnet operated switch 62 when in the ON position shown in FIG. 10. Magnet operated switch 62, which may be a magnetic reed switch for example, couples power to connector 46 to operate portable memory cartridge 34 and also provides power to a miniature solenoid 63 which operates to push a magnetic core 64 into a locking aperture within tray 33. When actuator member 60 is changed to the OFF position, the magnetic switch opens and disconnects power from solenoid 63. An internal spring (not shown) withdraws the core element 64 and thus permits tray assembly 31 to be withdrawn from the housing.

The embodiment of this invention in FIG. 10 thus involves another form of cooperative interlock means on the housing 21 and the carrier means (tray 33) which is operatively associated with switch actuator means 60,61 when the carrier means is in the connected position to lock the carrier within the housing when the switch actuator is in the ON position and to unlock the carrier for removal from the housing when the switch actuator is in the OFF position.

It should be understood that this invention is not limited to use with a portable memory cartridge carried on a tray as in the embodiments shown and described. It could also be employed with any removable circuit component which is provided with some form of carrier means for carrying that component between a connected position within the housing and a disconnected position for removal from the housing. For example, a circuit card or circuit card module might be employed together with a handle that is removably mounted to the circuit card for inserting it into the system with an edge connector on the circuit card being pushed into a cooperative connector on a circuit board within the housing. Use of the arrangement of this invention ensures that power to the circuit component is shut off before the component is withdrawn. It should thus be apparent that the embodiments of this invention shown in the drawings and described above are given by way of example only and that many other embodiments are readily conceivable by persons of skill in the art. Furthermore, many modifications and variations of the embodiments described above could readily be made by skilled persons without departing from the scope of this invention as claimed in the following claims.

What is claimed is:

1. Electronic circuit apparatus, including a removable circuit component having a connector on one end thereof, comprising:

housing means including a wall defining an opening for inserting said removable circuit component;

connector means mounted within said opposite said opening for receiving said connector on said removable circuit component;

switch means mounted on the interior of said housing means substantially in the vicinity of said opening and being connected between a source of electric power and said removable circuit component to control application of electric power to said removable circuit component through said connector means;

carrier means for carrying said removable circuit component between a connected position and a disconnected position for removal from said housing through said opening and including a switch actuator means manually movable between respective ON and OFF positions and operable when said removable circuit component is in said connected position in said housing to close said switch means and apply power to said connector means when moved from said OFF position to said ON position and to open said switch means and disconnect power from said connector means when moved from said ON position to said OFF position; and cooperative interlock means on said housing and said carrier means and operatively associated with said switch actuator means when said carrier means is in said connected position to lock said carrier means within said housing when said switch actuator means is in said ON position and to unlock said carrier means for removal from said housing when said switch actuator means is in said OFF position;

said switch means being mounted adjacent one side of said opening and including a switch closure element facing toward said opening;

said switch actuator means comprising a first member accessable to the outside of said housing means when said carrier means is in a connected position and slidable between ON and OFF positions and a second member positioned within said housing when said carrier means is in said connected position and operably coupled to said first member for movement between first and second positions respectively associated with said ON and OFF positions of said first member and operating said switch closure element to close said switch means when in said first position;

said cooperative interlock means comprising an edge portion of said wall in said housing defining said opening and an edge portion of said second member which abutts said edge portion of said wall when said second member is in said first position to prevent said carrier means being withdrawn from said housing when said first member is in said ON position with power applied to said removable circuit component;

said removable circuit component being a portable memory cartridge having a connector on one end thereof;

said carrier means comprising a tray member for carrying said portable memory cartridge with said connector adjacent one end of said tray member and a handle member on the opposite end of said tray member including a first portion extending outside said opening of said housing in said connected position and a second portion located inside said housing in said connected position;

said housing including tray guide means mounted opposite the edges of said opening for guiding said tray member as said carrier means is inserted into said housing and connector means on one end of said tray guide means for connecting said connector on said portable memory cartridge to other circuitry within said housing; and said second portion of said handle member having a channel therein extending parallel the plane of said opening defined in said wall of said housing and positioned immediately adjacent an inner surface of said wall, said second member comprising a bar carried in said channel with said first position comprising one end of said bar being entirely within said channel and said second position comprising said one end of said bar being positioned a short distance outside of said channel, said switch means being mounted adjacent said inner surface of said wall facing said channel and having said switch closure element actuated by said one end of said bar when in said second position, an edge portion of said bar abutting said inner surface of said wall when in said second position to thereby prevent said carrier means from being withdrawn from said housing until said first member of said switch actuator means is moved to an OFF position to thereby withdraw said bar within said channel and deactuate said switch means to remove electrical power from a portable memory cartridge carried on said tray member.

2. A transaction terminal apparatus comprising:

a housing having a sidewall defining a generally rectangular opening;

a tray member adapted for carrying a portable memory cartridge and being insertable in said opening in said sidewall, said portable memory cartridge having a connector on one end thereof and being carried in said tray with said connector facing a direction opposite to said opening in said sidewall;

guide means disposed within housing for guiding said tray member as it is being inserted;

connector means mounted in said housing at one end of said guide means and facing said opening for engaging said connector on said portable memory cartridge to connect said portable memory cartridge with circuitry of said transaction terminal;

a power supply means for supplying power to circuits of said transaction terminal including supplying power to said portable memory cartridge through said connector means;

switch means in circuit with said power supply means for controlling the supply of power to at least connector means for said portable memory cartridge, said switch means being mounted within said housing adjacent said opening in said sidewall;

switch actuator means carried on said tray member including a first member accessable outside said housing when said tray member is inserted therein and being movable between ON and OFF positions and a second member positioned within said housing when said tray member is inserted and being moved by said first member between first and second positions respectively associated with said ON and OFF positions, said second member being operative when in said first position to turn said switch means ON and also to engage a portion of said sidewall to preclude removal of said tray from said housing while said switch means is ON and power is applied to a portable memory cartridge carried on said tray.

3. Apparatus as claim in claim 2, wherein said tray member includes a handle member including a first handle portion positioned outside said housing when said tray is fully inserted and a second handle portion positioned within said housing when said tray is fully inserted;

said first handle portion having a bottom surface defining a recessed area with said first member of said switch actuator means carried therewithin and slidable in a plane transverse to said sidewall of said housing between said ON and OFF positions;

said second handle portion having a channel formed therein and extending parallel to said sidewall of said housing and positioned immediately adjacent thereto when said tray member is fully inserted within said housing with said second member of said switch actuator means carried within said channel and slidable between said first and second positions in response to sliding of said first member between said ON and OFF positions thereof.

4. Apparatus as claimed in claim 3, wherein said first member of said switch actuator means is mounted within said recessed area to slide in a direction parallel to said sidewall; said recessed area in said first handle portion communicates with said channel in said second handle portion; and said second member of said switch actuator means is rigidly connected to said first member thereof for conjoint movement therewith.

* * * * *